United States Patent [19]

Kashiwadate et al.

[11] Patent Number: 5,436,300
[45] Date of Patent: Jul. 25, 1995

[54] COMPOSITION COMPRISING POLYARYLENE SULFIDE AND POLYAMIDE COMPOSITION

[75] Inventors: Ken Kashiwadate; Mitsuru Hoshino; Shuji Morinishi; Yukichika Kawakami, all of Fukushima, Japan

[73] Assignee: Kureha Kagaku Kogyo Kabushiki Kaisha, Tokyo, Japan

[21] Appl. No.: 77,536

[22] Filed: Jun. 17, 1993

Related U.S. Application Data

[63] Continuation of Ser. No. 819,975, Jan. 13, 1992, abandoned.

[30] Foreign Application Priority Data

Jan. 14, 1991 [JP] Japan .................................. 3-016011

[51] Int. Cl.⁶ ............................................. C08F 283/04
[52] U.S. Cl. ............................................. 525/420; 525/537
[58] Field of Search ................................. 525/420, 537

[56] References Cited

U.S. PATENT DOCUMENTS

| | | |
|---|---|---|
| 4,486,578 | 12/1984 | Asakura et al. |
| 4,528,335 | 7/1985 | Selby et al. ............ 525/540 |
| 4,605,732 | 8/1986 | Heitz et al. ............ 525/537 |
| 4,699,975 | 10/1987 | Katto et al. ............ 525/537 |
| 4,786,554 | 11/1988 | Baker et al. ............ 428/364 |
| 5,015,703 | 5/1991 | Takekoshi et al. ............ 525/537 |
| 5,015,704 | 5/1991 | Takekoshi et al. ............ 525/537 |
| 5,086,128 | 2/1992 | Heinz et al. ............ 525/537 |
| 5,086,129 | 2/1992 | Kohler et al. ............ 525/537 |
| 5,214,083 | 5/1993 | Kodaira et al. ............ 525/391 |

FOREIGN PATENT DOCUMENTS

| | | |
|---|---|---|
| 0086487 | 8/1983 | European Pat. Off. |
| 0394933 | 10/1990 | European Pat. Off. |
| 2470780 | 6/1981 | France. |
| 591422 | 1/1984 | Japan. |
| 292958 | 4/1990 | Japan. |
| 2169667 | 6/1990 | Japan ..................... C08L 77/00 |

OTHER PUBLICATIONS

Heitz, W. Makromol. Chem., Macromol. Symp. 26, 1–8 (1989).
Freund, L. and Heitz, W. Makromol. Chem. 191, 815–825 (1990).
Derwent Accession No. 90-243 00.
Derwent Accession No. 90-145 167.

*Primary Examiner*—Robert E. Sellers
*Assistant Examiner*—Helen F. Lee
*Attorney, Agent, or Firm*—Sughrue, Mion, Zinn, Macpeak & Seas

[57] ABSTRACT

A composition is disclosed, comprising
(1) a polyamide as a dispersed phase and
(2) a polyarylene sulfide as a continuous phase, wherein at least a part of the polyarylene sulfide has at least one modifying group directly bonded to the aromatic ring thereof, where the modifying group is selected from the group consisting of a carboxyl group, an alkali metal salt of a carboxyl group, and an alkaline earth metal salt of a carboxyl group, and where the modifying group is present at a ratio of 10 or more millimoles of the modifying group per kilogram of the polyamide. The composition has improved mechanical strength.

9 Claims, No Drawings

COMPOSITION COMPRISING POLYARYLENE SULFIDE AND POLYAMIDE COMPOSITION

This is a Continuation of application Ser. No. 07/819,975 filed Jan. 13, 1992, now abandoned.

FIELD OF THE INVENTION

This invention relates to a composition comprising a polyarylene sulfide and a polyamide, and more particularly, to a composition comprising a polyamide as a dispersed phase and a polyarylene sulfide as a continuous phase.

BACKGROUND OF THE INVENTION

It is known to blend a polyarylene sulfide and a polyamide as disclosed in JP-B-59-1422 (the term "JP-B" as used herein means an "examined published Japanese patent application"). A mere blend of these two components, though having improved fluidity over the polyarylene sulfide alone, provides molded articles of poor surface properties due to insufficient compatibility between a polyarylene sulfide and a polyamide. In addition, a composition in which a polyamide forms a dispersed phase generally has reduced mechanical strength as compared with a polyamide or a polyarylene sulfide alone. On the other hand, a composition in which a polyamide forms a continuous phase has improved mechanical characteristics, particularly toughness, but has reduced chemical resistance and hot water resistance as compared with a polyarylene sulfide alone.

JP-A-2-169667 (the term "JP-A" as used herein means an "unexamined published Japanese patent application") discloses a composition comprising a modified polyarylene sulfide and a polyamide, the modified polyarylene sulfide being obtained by reacting a polyarylene sulfide prepared from an alkyl substituted dihalo-aromatic compound, a dihalo-aromatic compound, and an alkali metal sulfide with a substituted olefin having at least one functional group selected from a carboxyl group, a carboxylic acid anhydride group, a carboxylic acid ester group, a carboxylic acid metal salt group, an epoxy group, and an imido group in the molecule thereof. According to JP-A-2-169667, the starting polyarylene sulfide to be modified must contain a constituent unit having an alkyl substituent group on the aromatic group because the reaction between the substituted olefin compound as a modifier and the polyarylene sulfide is believed to predominantly take place at this alkyl substituent group moiety. The disclosure is that compatibility with a polyamide is greatly improved by this modification to thereby provide a useful resin composition. In other words, the modifying group should be bonded to the alkyl substituent group moiety of the alkyl substituent group-containing constituent unit but not directly to the aromatic ring.

SUMMARY OF THE INVENTION

An object of the present invention is to provide a composition comprising a polyarylene sulfide and a polyamide and having improved mechanical strength.

The present invention is based on the discovery that modification of a polyarylene sulfide for improving compatibility with a polyamide can be accomplished by directly bonding a modifying group to the aromatic ring of a polyarylene sulfide unlike the above-described known technique which essentially requires the presence of an alkyl substituent group on the aromatic ring.

That is, the present invention provides a composition comprising (1) a polyamide as a dispersed phase and
(2) a polyarylene sulfide as a continuous phase, wherein at least a part of the polyarylene sulfide has at least one modifying group directly bonded to the aromatic ring thereof, where the modifying group is selected from the group consisting of a carboxyl group, an alkali metal salt of a carboxyl group, and an alkaline earth metal salt of a carboxyl group, and where the modifying group is present at a ratio of 10 or more millimoles of the modifying group per kilogram of the polyamide.

DETAILED DESCRIPTION OF THE INVENTION

In the composition of the present invention, the dispersed phase comprises a polyamide, with the continuous phase comprising a polyarylene sulfide. A composition comprising a polyamide as a continuous phase and a modified polyarylene sulfide as a dispersed phase does not show any significant improvement in mechanical strength over a composition using unmodified polyarylene sulfide as a dispersed phase.

As is well known in the art, whether a polyamide forms a dispersed phase or not in a composition is mostly determined by the volume fraction of the polyamide present in the composition. Even where a polyamide has a volume fraction sufficient to become a dispersed phase, some cases are known in which a polyamide forms a continuous phase if the melt viscosity ratio of the polyarylene sulfide to the polyamide is too high. Accordingly, it is necessary to control the melt viscosity of the two components so that the polyamide forms a dispersed phase.

If desired, the composition of the present invention may further contain, in addition to a polyamide and a polyarylene sulfide, other components such as fibers, e.g., glass fibers and carbon fibers, resin modifiers, e.g., ethylene glycidyl methacrylate, elastomers, coupling agents, lubricants, stabilizers, nucleating agents, and inorganic fillers, e.g., talc, calcium carbonate, and silica. These other compositions may be incorporated in an amount of from 0 to 60% by weight, and preferably from 0 to 50% by weight, based on the weight of the composition.

The process for preparing the composition of the present invention is not particularly limited. Preferably, a polyarylene sulfide and a polyamide are premixed in a Henschel mixer, a tumbling mixer, etc., and the blend is melt-kneaded and pelletized by means of an extruder. Fillers, e.g., glass fiber, if used, are added to the blend before melt-kneading, followed by further mixing.

The polyarylene sulfide which can be used in the present invention is a polymer mainly comprising a repeating unit of the formula —Ar—S—, wherein —Ar— represents an arylene group. The terminology "mainly comprising" as used herein means that the proportion of the unit —Ar—S— is at least 50 mole %, preferably at least 70 mole %, and more preferably 90 mole % or more, taking the unit —Ar—S— as 1 mole (the terminology "mole" is sometimes used in this sense herein). The arylene group —Ar— preferably includes those having a phenylene group, particularly a p-phenylene group, as a main element thereof.

Specific but non-limitative examples of the polyarylene sulfide which can be used in the present invention are illustrated below.

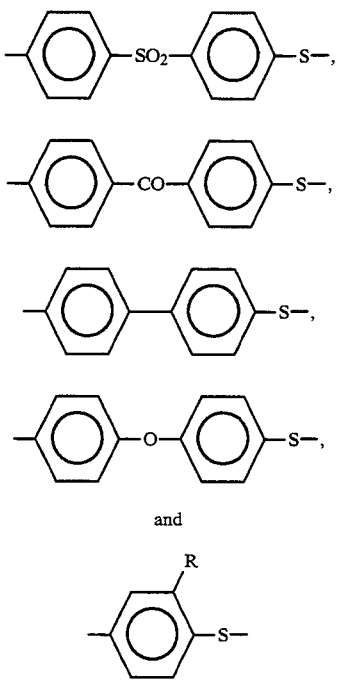

In the above formulae, R represents an alkyl group containing from 1 to 3 carbon atoms.

The polyarylene sulfide which can be used in the present invention is the above-described polymer at least a part of which has a modifying group selected from a carboxyl group, an alkali metal salt of a carboxyl group, and an alkaline earth metal salt of a carboxyl group directly bonded to the aromatic ring thereof. Examples of the alkali metal of the alkali metal salts which can be used include sodium, potassium, and lithium, and examples of the alkaline earth metal of the alkaline earth metal salts which can be used include calcium, barium, strontium, and magnesium.

The modifying group is incorporated in such an amount that the ratio, expressed in millimoles on the basis of the modifying group, per kilogram of the polyamide (hereinafter referred to as the modifying group ratio) is 10 or more, preferably 25 or more, and more preferably 40 or more. The millimole number of the modifying group can be determined by ion chromatography for an alkali metal salt or an alkaline earth metal salt or by induction bonding plasma emission spectroscopic analysis (using an "MT-5", commercially available from Yanaco) for a carboxyl group.

A polyarylene sulfide having such a modifying group can be obtained by polymerizing at least one of a dihalo aromatic carboxylic acid and an alkali metal or alkaline earth metal salt thereof, a dihalo aromatic compound, and an alkali metal sulfide in a polar solvent. When a granular polymer is desired, the process for producing a polyarylene thioether copolymer disclosed in a U.S. patent application, filed Nov. 26, 1991 by Mitsuru Hoshino, Yukichika Kawakami and Takayuki Katto, titled with "PROCESS FOR PRODUCTION OF POLY(ARYLENE THIOETHER) COPOLYMER" and claiming a priority date from Japanese Patent Application No. Hei. 2-410082, filed Dec. 13, 1990, can be used.

The polyamide which can be used in the present invention is not limited, and any known polyamides including copolymer polyamides and mixed polyamides can be used. Polycaprolactam (nylon 6), polyundecanoamide (nylon 11), polydodecanoamide (nylon 12), polyhexamethylene adipamide (nylon 66), polytetramethylene adipamide (nylon 46), aromatic polyamides, e.g., polyhexamethylene terephthalamide and polyhexamethylene isophthalamide, copolymer polyamides mainly comprising monomer units of these polyamides, and mixtures of these polyamides are generally used.

A suitable amount of the polyarylene sulfide in the composition of the present invention is from 50 to 95% by volume, and preferably from 50 to 90% by volume based on the total volume of the polyarylene sulfide and polyamide.

The present invention is now illustrated in greater detail by way of the following Examples, but it should be understood that the present invention is not to be deemed to be limited thereto. All percents are by weight unless otherwise indicated The physical properties of the starting materials and the compositions prepared were measured as follows.

Melt Viscosity

A pelletized composition before injection molding was charged in a capillary viscometer "Capillograph" (manufactured by Toyo Seiki K.K.) including a nozzle having an ID of 1 mm and an L/D ratio of 10. The melt viscosity (poise) was measured at a temperature of 310° C. and at a shear rate of 1200/sec.

Flexural Properties

Flexural strength (kgf/mm$^2$), flexural modulus of elasticity (kgf/mm$^2$), and deflection in bending (mm) were measured according to ASTM D-790.

Izod Impact Strength

Izod impact strength (kgfcm/cm) was measured according to ASTM D-256.

Heat Resistance

Heat resistance was measured according to ASTM D-648.

The following materials were used in the Examples.

Polyphenylene Sulfide (PPS)

Polyphenylene sulfide produced by Kureha Chemical Industry Co., Ltd. having a melt viscosity of 500 poises was used.

Polyarylene Sulfide (PAS) Copolymer A

In a titanium-lined autoclave were charged 8000 g of N-methylpyrrolidone (NMP), 3360 g (19.99 mole) of hydrated sodium sulfide (water content: 53.6%), and 60 g (0.81 mole) of calcium hydroxide. After displacement with nitrogen, the temperature was gradually increased to 200° C. to distil off 2550 g of an NMP solution containing 1260 g of water and 0.50 mole of hydrogen sulfide. Then, 2770 g (18.84 mole) of p-dichlorobenzene, 192 g (1.01 mole) of 3,5-dichlorobenzoic acid, and 3000 g of NMP were fed, and the mixture was reacted at 220° C. for 6 hours. To the reaction mixture was added 1000 g (55.49 mole) of water under pressure, and the reaction was continued at 250° C. for 1 hour and then at 255° C. for 3 hours.

The copolymer produced was collected from the reaction mixture, washed with acetone, dipped in water adjusted to a pH of 1 with HCl with stirring for 2 hours, washed with water, dehydrated, and then dried to obtain PAS Copolymer A.

The infrared absorption spectrum of PAS Copolymer A revealed an absorption assigned to a carboxylic acid at 1700 cm$^{-1}$. The calcium content detected by ion chromatography was only 70 ppm. These analytical results indicate that 3,5-dichlorobenzoic acid had been definitely copolymerized with its carboxylic acid existing as an acid. The proportion of the carboxylic acid-modified arylene sulfide component in PAS Copolymer A was found to be 4.8 mole % by oxygen analysis.

PAS Copolymer A had a melting point of 281° C., a glass transition temperature (Tg) of 84° C., and a melt viscosity of 160 poises.

PAS Copolymer B

In a titanium-lined autoclave were charged 8000 g of NMP, 3360 g (19.99 mole) of hydrated sodium sulfide (water content: 53.6%), and 60 g (0.81 mole) of calcium hydroxide. After displacement with nitrogen, the temperature was gradually increased to 200° C. to distil off 2400 g of an NMP solution containing 1260 g of water and 0.50 mole of hydrogen sulfide. Then, 2646 g (18.00 mole) of p-dichlorobenzene, 384 g (2.01 mole) of 3,5-dichlorobenzoic acid, and 3000 g of NMP were fed, and the mixture was reacted at 220° C. for 5 hours. To the reaction mixture was added 1000 g (55.5 mole) of water under pressure, and the reaction was continued at 255° C. for 3 hours.

The resulting reaction mixture was worked up in the same manner as for PAS Copolymer A to obtain PAS Copolymer B.

The infrared absorption spectrum of PAS Copolymer B showed an absorption at 1700 cm$^{-1}$, and the calcium content detected by ion chromatography was only 60 ppm, indicating that 3,5-dichlorobenzoic acid had been definitely copolymerized with its carboxylic acid existing as an acid. The proportion of carboxylic acid-modified arylene sulfide component in PAS Copolymer B was found to be 9.5 mole % by oxygen analysis.

PAS Copolymer B had a melting point of 276° C., a Tg of 80° C., and a melt viscosity of 60 poises.

PAS Copolymer C

In a titanium-lined autoclave were charged 4000 g of NMP, 1680 g (9.99 mole) of hydrated sodium sulfide (water content: 53.6%), and 20 g (0.27 mole) of calcium hydroxide. After displacement with nitrogen, the temperature was gradually increased to 200° C. to distil off 1600 g of an NMP solution containing 630 g of water and 0.20 mole of hydrogen sulfide. Then, 1385 g (9.42 mole) of p-dichlorobenzene, 95.5 g (0.50 mole) of 3,5-dichlorobenzoic acid, and 1900 g of NMP were fed, and the mixture was reacted at 220° C. for 6 hours. To the reaction mixture was added 500 g (27.7 mole) of water under pressure, and the reaction was continued at 255° C. for 4 hours.

The copolymer produced was separated from the reaction mixture, washed successively with acetone and water, dehydrated, and then dried to obtain PAS Copolymer C.

PAS Copolymer C was found to contain 8000 ppm of calcium and showed no absorption at 1700 cm$^{-1}$ assigned to a carboxylic acid in its infrared absorption spectrum but, instead, showed an absorption assigned to a carboxylate in the vicinity of 1640 cm$^{-1}$ (shoulder) and in the vicinity of 1440 cm$^{-1}$. It was thus confirmed that 3,5-dichlorobenzoic acid had been definitely copolymerized and that almost all of the carboxyl groups thereof were present in the form of the calcium salt. The proportion of carboxylate-modified arylene sulfide component in PAS Copolymer C was found to be 4.8 mole % by induction bonding plasma emission spectroscopic analysis.

PAS Copolymer C had a melting point of 276° C., a Tg of 90° C., and a melt viscosity of 4500 poises.

PAS Copolymer D

PAS Copolymer D was prepared in the same manner as for PAS Copolymer A, except for changing the amounts of p-dichlorobenzene and 3,5-dichlorobenzoic acid to 2889 g (19.65 mole) and 38 g (0.20 mole), respectively, and replacing 60 g of calcium hydroxide by 8 g (0.2 mole) of sodium hydroxide.

The proportion of the carboxyl-modified arylene sulfide component in PAS Copolymer D was found to be 1 mole % by oxygen analysis.

PAS Copolymer D has a melting point of 283° C., a Tg of 84° C., and a melt viscosity of 1000 poises.

Polyamide A

Nylon 66 ("Nylon 1003-2" supplied by Polyplastics Co., Ltd.)

Polyamide B

Nylon 6 ("T-802" supplied by Toyobo Co., Ltd.)

Polyamide C

Nylon 46 ("TS-300" produced by Japan Synthetic Rubber Co., Ltd.)

Glass Fibers

"ECS-03T" produced by Japan Electric Glass Co., Ltd.

EXAMPLES 1 TO 11 AND COMPARATIVE EXAMPLES 1 TO 7

PPS granules, PAS copolymer granules, and polyamide pellets shown in Table 1 below were uniformly dry-blended in a Henschel mixer at a mixing ratio (part by weight) as shown in Table 1 below. Glass fibers, if used, were added thereto, followed by further premixing. The resulting blend was dried in a vacuum drier at 70° C. at a degree of vacuum of 1 mmHg-abs or less for about 7 hours to thoroughly remove the water content in the polyamide and other materials. The blend was supplied to a twin-screw extruder having a diameter of 30 mm, melt-kneaded at 290° to 310° C., extruded in strands, and cut to obtain pellets.

The melt viscosity of the composition was measured using the pellets. Measurements of other physical properties of the composition were made on test samples prepared by injection molding at 290° to 320° C. Injection molding was carried out by using an injection molding machine "IS-25EP-V" manufactured by Toshiba Corporation under the following conditions.

Holding Pressure: 250–500 kg/cm$^2$
Mold Temperature: 145° C.
Injection Pressure: 1200–1500 kg/cm$^2$
Injection Speed: 16–30 cc/sec
Cylinder Set Temperature:
    Nozzle tip: 290° C.
    H$_1$: 300° C.
    H$_2$: 290° C.
    H$_3$: 280° C.
    H$_4$: 260° C.

The results of measurements of physical properties are shown in Table 2 below. Further, the phase structure of the composition was determined using a scanning type electron microscope.

Accordingly, the weight of carboxyl-modified arylene sulfide component was 16.5 g, which corresponded to 108 mmole.

TABLE 1

| Example No. | Polyarylene Sulfide/Polyamide Composition | | | | | | | | Glass Fibers (parts) |
|---|---|---|---|---|---|---|---|---|---|
| | PAS | | | | | Polyamide | | | |
| | PPS (parts) | Copolymer | | | | Kind | Amount (parts) | Phase Structure | |
| | | Kind | Amount (parts) | Modifying Group Ratio (mmole/kg-polyamide) | Phase Structure | | | | |
| Comparative Example 1 | 48 | — | 0 | — | Continuous | A | 12 | Dispersed | 40 |
| Example 1 | 45 | A | 3 | 108 | Continuous | A | 12 | Dispersed | 40 |
| Comparative Example 2 | 36 | — | 0 | — | Continuous | A | 24 | Dispersed | 40 |
| Example 2 | 35 | A | 1 | 18 | Continuous | A | 24 | Dispersed | 40 |
| Example 3 | 33 | A | 3 | 54 | Continuous | A | 24 | Dispersed | 40 |
| Example 4 | 31 | A | 5 | 90 | Continuous | A | 24 | Dispersed | 40 |
| Comparative Example 3 | 36 | — | 0 | — | Continuous | B | 24 | Dispersed | 40 |
| Example 5 | 33 | A | 3 | 54 | Continuous | B | 24 | Dispersed | 40 |
| Comparative Example 4 | 36 | — | 0 | — | Continuous | C | 24 | Dispersed | 40 |
| Example 6 | 33 | A | 3 | 54 | Continuous | C | 24 | Dispersed | 40 |
| Comparative Example 5 | 12 | — | 0 | — | Dispersed | A | 48 | Continuous | 40 |
| Comparative Example 6 | 9 | A | 3 | 27 | Dispersed | A | 48 | Continuous | 40 |
| Comparative Example 7 | 60 | — | 0 | — | Continuous | A | 40 | Dispersed | 0 |
| Example 7 | 55 | A | 5 | 54 | Continuous | A | 40 | Dispersed | 0 |
| Example 8 | 55 | B | 5 | 105 | Continuous | A | 40 | Dispersed | 0 |
| Example 9 | 55 | C | 5 | 54 | Continuous | A | 40 | Dispersed | 0 |
| Example 10 | 33 | C | 3 | 54 | Continuous | A | 24 | Dispersed | 40 |
| Example 11 | 0 | D | 36 | 137 | Continuous | A | 24 | Dispersed | 40 |

TABLE 2

| Example No. | Melt Viscosity (poise) | Flexural Properties | | | Izod Impact Strength | | Heat Resistance (°C.) |
|---|---|---|---|---|---|---|---|
| | | Strength (Kgf/mm$^2$) | Modulus of Elasticity (Kgf/mm$^2$) | Deflection (mm) | Notched (Kgfcm/cm) | Unnotched (Kgfcm/cm) | |
| Comparative Example 1 | 1080 | 24.3 | 1490 | 6.8 | 35 | 6.9 | 266 |
| Example 1 | 1070 | 26.5 | 1480 | 7.6 | 49 | 7.9 | 267 |
| Comparative Example 2 | 980 | 23.1 | 1390 | 6.9 | 32 | 7.3 | 265 |
| Example 2 | 1000 | 24.0 | 1370 | 7.0 | 35 | 7.7 | — |
| Example 3 | 1020 | 25.0 | 1370 | 7.2 | 37 | 7.9 | 265 |
| Example 4 | 1030 | 25.8 | 1350 | 7.4 | 40 | 8.2 | — |
| Comparative Example 3 | 420 | 25.4 | 1350 | 8.4 | 34 | 8.9 | 221 |
| Example 5 | 440 | 26.7 | 1360 | 8.9 | 56 | 10.7 | 223 |
| Comparative Example 4 | 680 | 24.5 | 1390 | 7.8 | 37 | 6.6 | 282 |
| Example 6 | 740 | 25.6 | 1380 | 8.1 | 42 | 7.0 | 277 |
| Comparative Example 5 | 260 | 27.1 | 1210 | 11.8 | 78 | 8.7 | 255 |
| Comparative Example 6 | 290 | 23.9 | 1210 | 9.5 | 56 | 7.2 | 253 |
| Comparative Example 7 | 310 | 10.5 | 335 | — | 19 | 1.5 | — |
| Example 7 | 320 | 11.2 | 339 | — | 25 | 2.1 | — |
| Example 8 | 250 | 11.7 | 342 | — | 35 | 2.6 | — |
| Example 9 | 350 | 11.1 | 325 | — | 30 | 2.0 | — |
| Example 10 | 1060 | 25.2 | 1380 | 7.4 | 39 | 7.9 | — |
| Example 11 | 1160 | 24.9 | 1310 | 7.6 | 49 | 7.9 | — |

The modifying group ratio, i.e., the millimole number of modifying group per kilogram of polyamide, was calculated as follows. In, for example, Example 1, 3 g of PAS Copolymer A was used per 12 g of polyamide, which corresponded to 250 g of PAS Copolymer A per kilogram of polyamide. The proportion of the carboxyl-modified arylene sulfide component in PAS Copolymer A was 4.8 mole %. The term "mole" as used herein was calculated by taking the unit —Ar—S— as one mole.

On comparing the results of Example 1 with the results of Comparative Example 1, or those of Examples 2, 3, 5, etc. with those of Comparative Example 2, it is apparent that the strength increases and the modulus of elasticity decreases as the amount of PAS Copolymer A increases. Such a correlation is also seen by comparing the results of Examples 7, 8, 9, etc. with those of Comparative Example 7 in which PAS Copolymers B, C, D, etc. were used. These effects are produced as well where no PPS is present as in Example 11 as long as the polyamide forms a dispersed phase. To the contrary, as can be seen by comparing the results of Comparative Example 5 and those of Comparative Example 6, such effects cannot be obtained where the polyamide forms a continuous phase.

As described above, use of the modified polyarylene sulfide copolymer in compositions comprising a polyamide and a polyarylene sulfide results in improvements in flexural strength, impact strength, and the like.

While the invention has been described in detail and with reference to specific examples thereof, it will be apparent to one skilled in the art that various changes and modifications can be made therein without departing from the spirit and scope thereof.

What is claimed is:

1. A composition comprising
   (1) a polyamide as a dispersed phase and
   (2) a polyarylene sulfide as a continuous phase, wherein the proportion of the polyarylene sulfinde in the composition is from 50 to 95% by volume based on the total volume of the polyarylene sulfide and polyamide,
   wherein at least a part of the polyarylene sulfide has at least one modifying group directly bonded to the aromatic ring thereof, where the modifying group is a carboxyl group, and where the modifying group is present at a ratio of 10 or more millimoles of the modifying group per kilogram of the polyamide,
   wherein the polyamide is selected from the group consisting of polycaprolactam, polyundecanoamide, polydodecanoamide, polyhexamethylene adipamide, polytetramethylene adipamide, copolymer polyamides of the monomer units of the previously recited polyamides, and mixtures thereof.

2. The composition of claim 1, wherein the polyarylene sulfide includes as a monomer unit a unit of the formula —Ar—S— wherein Ar is an arylene group.

3. The composition of claim 2, wherein Ar is a phenylene group.

4. The composition of claim 2, wherein the proportion of units of the formula —At—S— is at least 50 mole %.

5. The composition of claim 1, wherein the ratio of the millimoles of modifying group per kilogram of the polyamide is 25 or more.

6. The composition of claim 1, wherein the ratio of the millimoles of modifying group per kilogram of the polyamide is 40 or more.

7. The composition of claim 1, wherein the composition additionally includes one or more of fibers, resin modifiers, elastomers, coupling agents, lubricants, stabilizers, and nucleating agents.

8. The composition of claim 1, wherein the proportion of the polyarylene sulfide in the composition is from 50 to 90% by volume based on the total volume of the polyarylene sulfide and polyamide.

9. A composition comprising
   (1) a polyamide as a dispersed phase and
   (2) a polyarylene sulfide as a continuous phase, wherein the proportion of the polyarylene sulfide in the composition is from 50 to 95% by volume based on the total volume of the polyarylene sulfide and polyamide,
   wherein at least a part of the polyarylene sulfide has at least one modifying group directly bonded to the aromatic ring thereof, where the modifying group is a carboxyl group, and where the modifying group is present at a ratio of 10 or more millimoles of the modifying group per kilogram of the polyamide,
   wherein the polyarylene sulfide includes as a monomer unit a unit of the formula —Ar—S— wherein Ar is an arylene group, and
   wherein the proportion of the units of the formula —Ar—S— is at least 70 mole %,
   wherein the polyamide is selected from the group consisting of polycaprolactam, polyundecanoamide, polydodecanoamide, polyhexamethylene adipamide, polytetramethylene adipamide, copolymer polyamides of the monomer units of the previously recited polyamides, and mixtures thereof.

* * * * *